UNITED STATES PATENT OFFICE.

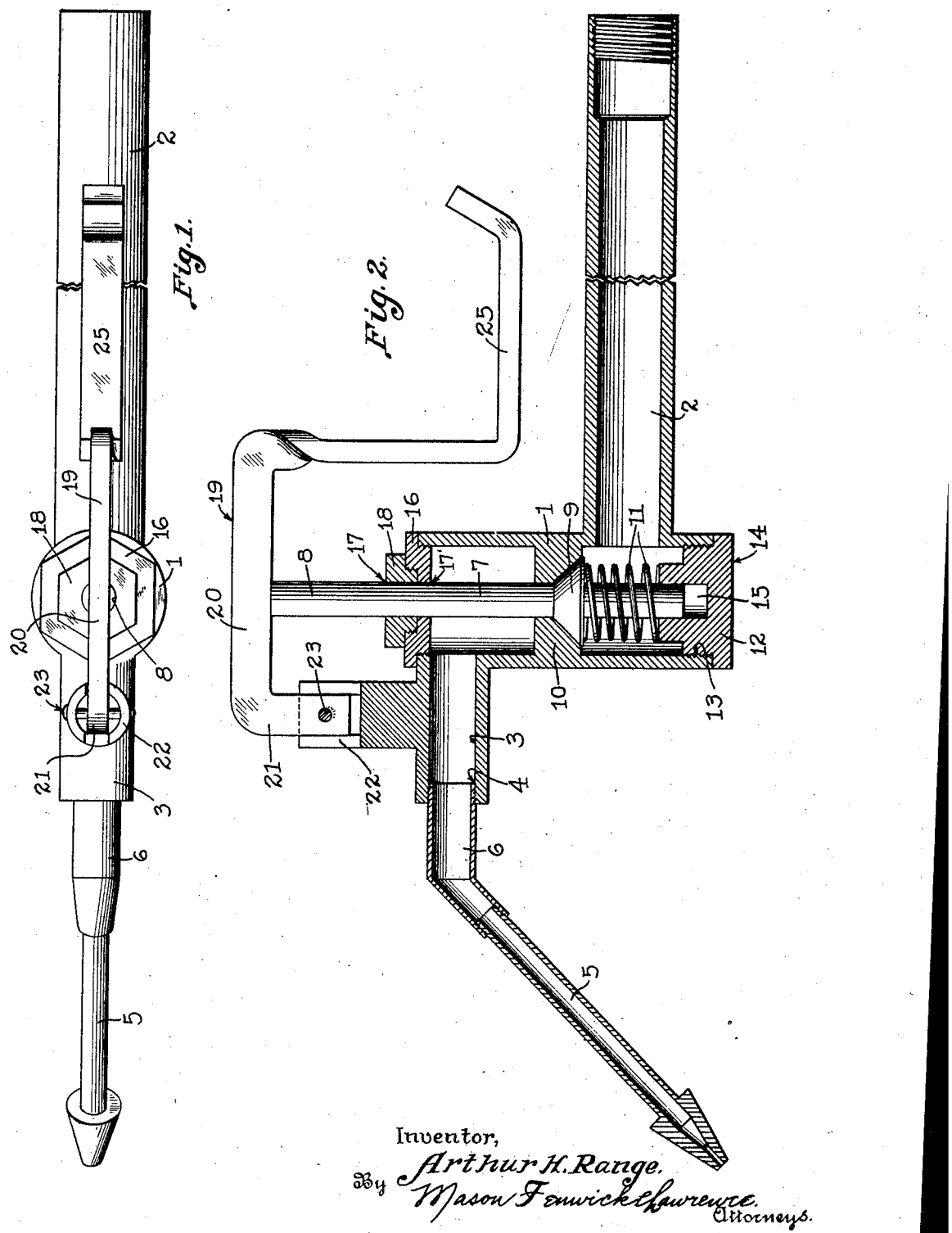

ARTHUR H. RANGE, OF PORTLAND, OREGON.

CRAB-MEAT-EXTRACTING APPARATUS.

1,385,951.  Specification of Letters Patent.  Patented July 26, 1921.

Application filed April 17, 1920. Serial No. 374,696.

*To all whom it may concern:*

Be it known that I, ARTHUR H. RANGE, citizen of the United States, residing at Portland, in the county of Multnomah and State of Oregon, have invented certain new and useful Improvements in Crab-Meat-Extracting Apparatus; and I do hereby declare the following to be a full, clear, and exact description of the invention, such as will enable others skilled in the art to which it appertains to make and use the same.

This invention relates to a new and improved apparatus for removing the meat from crabs or other crustaceans whereby the meat can be readily separated from the shells in a very short space of time.

A further object of the present invention is the provision of new and improved means for forcing or blowing of the crab meat from the shell after the crab has been primarily prepared for this operation, said means including a nozzle through which compressed air is delivered, the delivery of the air being controlled by a hand operated valve.

With the above and other objects in view, the invention consists in the novel features of construction, and the combination and arrangement of parts pointed out in the claim and shown in the accompanying drawings, in which—

Figure 1 is a top plan view of an apparatus constructed in accordance with my invention, and Fig. 2 is a longitudinal sectional view taken through the same.

In the construction of the apparatus which is illustrated in the accompanying drawings, I provide a cylindrical valve casing, generally indicated by the numeral 1, which has leading therefrom at a point adjacent one end an inlet pipe 2 which may be suitably connected in any desired manner to a source of compressed air supply. A suitable outlet is provided by means of the neck 3 which is integrally formed with the valve casing adjacent the end of the casing opposite to that end near the inlet pipe 2 and extends outwardly from the casing upon the side opposite the inlet pipe. This neck is internally threaded at its outer end as shown at 4 and engaged within the threaded neck portion is the discharge nozzle 5, the outer end of which extends at an oblique angle from the main body 6 of the nozzle which is attached to the neck 3. Thus it will be noticed that air passing in through the pipe 2 will be conducted through the casing 1 and out through the neck 3 and nozzle 5.

Mounted within the casing 1 for controlling the supply of air to the nozzle 5 is a valve member which includes in its construction a stem 7 arranged within the casing 1 and having one end projecting outwardly beyond the end of the casing as shown at 8. The valve 9 is formed integral with the stem 7 at a point adjacent one end thereof and is adapted to be normally engaged with the seat 10 formed within the casing 1. In order to normally retain the valve 9 in position upon the seat 10, a coil spring 11 is mounted upon the end of the valve stem, one end of which bears against the outer face of the valve, while the other end bears against the inner end of the removable plug 12. This plug 12 is threaded into the end of the casing 1 as shown at 13 and as shown in the accompanying drawings is provided with a hexagonal head 14, whereby a wrench or other similar tool can be used for removing this plug, should it be necessary. It will be noted that the inner end of the plug 12 is provided with a suitable orifice 15 to receive the end of the valve stem 7 so as to provide a suitable guide or holder for this end of the stem to retain the stem in its proper alined position.

The valve stem 7 is retained in position at the longer end by means of a guide cuff 16 which is threaded into the end of the casing 1 adjacent the neck 3 and provided with a central opening 17' through which the valve stem 7 passes. In order to further assist the cuff 16 in retaining the stem 7 in its proper alinement. I provide a collar 18, threaded onto the outer end of the cuff 16 and adapted to embrace the valve stem 7 as illustrated in Fig. 2. From this, it will be apparent that the valve stem 7 may be reciprocated through the openings 17 and 17' for opening and closing the valve 9.

In order that the apparatus may be readily held in the hand and at the same time actuate the valve for controlling the supply of compressed air to the nozzle 5, a suitable handle member 19 is provided which includes a transverse body portion 20 and the angularly projected end 21 which is pivotally mounted between the spaced arms 22 formed integral with the neck portion 3 and extending upwardly therefrom. The end portion 21 is retained in its pivotal position between the arms 22 by means of the transverse pivot pin 23 which extends through the end portion 21 and having its ends mounted in the arms 22. The main body of the handle is provided at its opposite end with an L-shaped portion 25, forming a hand grip, the transverse portion of which is arranged parallel with the inlet pipe 2 so that the hand of the operator will grasp the transverse portion 25 and the fingers engaging with the pipe 2 and as the body portion 20 of the handle is arranged directly above the stem 7, it will be noted that the operator can readily actuate the valve by pressing the transverse portion 25 of the handle toward the inlet pipe 2, this action reciprocating the stem 7 within the casing 1 and unseating the valve member 9. As soon as the operator releases the handle, the coil spring 11 which has been placed under tension by the unseating of the valve will return the valve to its normal seated position. From this it will be apparent that the operator can readily actuate the valve 9 to control the supply of compressed air and, at the same time, manipulate the apparatus as desired.

In removing the meat from the shell of crabs or other crustaceans, the method of operation consists in first pulling off the back of the crab and then cutting away the gills and tails, the intestines are then removed by applying water under pressure through a nozzle so that after this has been done, the crab is open and clean, ready for extraction of the meat. The body is then held in one hand and the blowing or extracting apparatus is grasped with the other hand and in order to force the meat from the shell of the crab, the valve 9 is actuated through the medium of the handle 19 by the hand of the operator whereby air under pressure is directed against the meat, forcing it out from the bony structure of the crab's body. From this it will be apparent that the shell of the crab can be readily cleaned of the meat in a very short space of time. It will be apparent that when the operator grasps the apparatus, it will be held in such a manner that the apparatus itself will be supported so that it can be readily manipulated and the transverse portion 25 of the handle is disposed in such a position in connection with the hand of the operator that the valve can be readily operated to control the supply of compressed air through the nozzle 5.

From the above description, taken in connection with the drawings accompanying this application, it will be readily apparent that I have provided a new method and apparatus for removing the meat from the shells of crabs or other crustaceans, which operation can be carried out in a very short space of time.

What I claim is:

A device of the class described including a body chamber, an air inlet connected with the chamber at a point adjacent one end, an air outlet connected with the chamber upon the opposite side from the inlet and disposed adjacent the opposite end of the chamber from the inlet, whereby the said inlet and outlet are disposed in different planes with respect to the body, a nozzle connected to the outlet and extending at an oblique angle with respect to the body, a spring actuated valve within the chamber adapted to normally close communication between the inlet and outlet, a valve stem extending up through the chamber, spaced arms formed on the outlet, an operating handle member including a transverse body portion, an angular projecting end pivotally arranged between the spaced arms on the outlet, said transverse body portion engaging the valve stem and an L-shaped portion formed at the end of the body portion opposite the angular projecting end to provide a hand grip for actuating the handle member to move the valve and open communication between the inlet and outlet.

In testimony whereof I affix my signature in presence of two witnesses.

ARTHUR H. RANGE.

Two witnesses:
A. L. BEAZIE,
E. K. THOMPSON.